Feb. 28, 1939.   G. T. REICH   2,148,579
RECOVERY OF FERMENTATION PRODUCTS AND THE LIKE
Filed Jan. 27, 1937
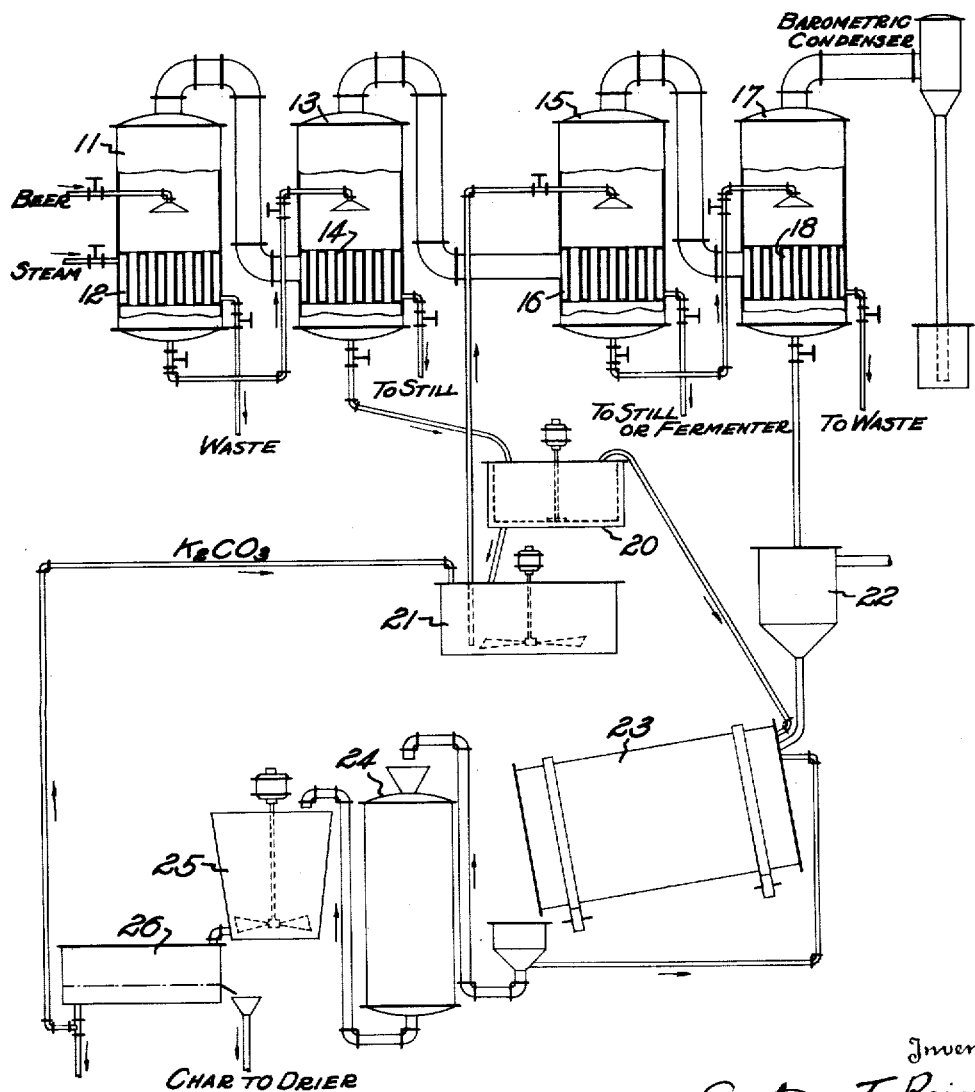
Inventor:
Gustave T. Reich
By Potter, Pierce & Scheffler
Attorneys.

Patented Feb. 28, 1939

2,148,579

UNITED STATES PATENT OFFICE 2,148,579

RECOVERY OF FERMENTATION PRODUCTS AND THE LIKE

Gustave T. Reich, Philadelphia, Pa.

Application January 27, 1937, Serial No. 122,649

8 Claims. (Cl. 252—3)

The present invention relates to improved methods of treating industrial liquids containing organic substances, and especially to improved methods of recovering valuable products from fermentation liquids or "beers" such as are produced by the yeast or bacterial fermentation of saccharine materials, such as molasses and grains, sugar house waste and the like, for the production of volatile solvents, for example, ethyl alcohol and butyl alcohol. It is particularly directed to improvements in methods previously invented by me for the concurrent removal of the volatile organic compounds of the beers and concentration of the aqueous slop for the production of activated carbon materials therefrom. One of these methods of concurrent distillation and concentration is described in my United States Patent No. 2,053,111.

The production of valuable activated carbon from the material remaining in the slop after the removal of volatile organic compounds therefrom is described in my United States Patent No. 1,925,204.

I have found that the treatment of normally acid industrial liquids containing organic substances may be greatly aided by the addition of alkaline materials thereto in association with evaporative concentration and that the production of activated carbon and other valuable materials from fermentation liquors may be very greatly facilitated by neutralizing the dealcoholized, partly concentrated slop or even by rendering it alkaline, with an alkaline alkali metal or alkaline earth metal compound, preferably with an alkali metal carbonate, such as sodium or potassium carbonate.

The addition of at least sufficient of the alkaline compound to the dealcoholized slop to render it neutral or slightly alkaline has been found to have many advantages. The alkali or alkali metal acts as an activating agent for the charcoal produced in the retorting. The slop may be evaporated to a much higher concentration in the evaporators if it is neutral or alkaline than if it is acid because the neutralization reduces the viscosity of the slop and renders the slop much more liquid at high concentrations.

It has been found to be particularly advantageous to effect the neutralization after the slop has been dealcoholized, and preferably after dealcoholizing in a multiple effect evaporator as described in my United States Patent No. 2,053,111, for example, whereby it is at the same time partially concentrated. In this way, alkali metal carbonates may be used for the neutralization without danger of loss of volatile organic compounds through the evolution of carbon dioxide. Since the slop is greatly reduced in volume the neutralization is much more economical at this stage as it may be performed in smaller vessels, and the neutralization is also facilitated by the fact that the slop is hot.

The neutralized slop is further concentrated, advantageously in a further effect of a multiple effect evaporator, in the first of effects of which the slop has been dealcoholized and partially concentrated. For example, when slop from the fermentation of molasses has been neutralized after dealcoholizing, in accordance with the present invention, it may be further concentrated by evaporation to a density of 42–44° Bé., while in its unneutralized condition a concentration above 36° Bé. is not practical.

It is also possible to spray-dry the slop at somewhat lower concentration. In order to decrease the difficulty of dehydrating the concentrated slop arising out of its tendency to expand to as much as eight or ten times its original volume on retorting, I have found that by admixing with highly concentrated or spray-dried slop from 10 to 50% of material which has been dehydrated at a temperature of about 350° C., the material may be dehydrated very readily in revolving retorts in a continuous process and the use of expensive stationary batch retorts may be eliminated. The admixture of a portion of previously dehydrated material with the concentrated slop largely avoids the expansion and the sticky gummy stage otherwise encountered in the dehydration.

The dehydrated char may be activated by further heating at higher temperatures, for example, as described in my United States Patent No. 1,925,204. Alkali metal carbonate may be leached from the activated carbon and a portion of the recovered alkali metal carbonate may be utilized for the neutralization of the slop as described above. Since the fermentation liquids commonly contain alkali metal compounds, and particularly potassium compounds, which form alkali metal carbonates during the charring operation, an excess of alkali metal carbonate is normally produced as a valuable product of the process.

As an illustrative example of one embodiment of the invention, the treatment of a beer obtained by the alcoholic fermentation of molasses will be more particularly described with reference to the accompanying drawing, which is a diagrammatic representation of an advantageous method of practicing the invention.

The beer is fed to effect 11 of a multiple effect evaporator. Calandria 12 of this effect is heated by steam. The vapors from effect 11, containing the major portion of the alcohol contained in the beer, are passed to calandria 14 of effect 13, and the condensed vapors are conducted to a rectifying still (not shown). The liquor from effect 11 passes to effect 13 where it is further concentrated and the residual alcohol is removed.

The dealcoholized slop from effect 13 is preferably passed through a separating device, such as centrifuge 20, whereby undissolved solids are removed. The liquid slop is fed into container 21 where it is neutralized, for example, with potassium carbonate, which may be obtained by leaching the activated char. It is often desirable to neutralize the dealcoholized slop before removing the solids, as the neutralization frequently increases the amount of solids present.

The neutralized slop is further concentrated in effects 15 and 17, effect 15 being heated in calandria 16 by vapors from effect 13 and vapors from effect 15 being passed to calandria 18 of effect 17.

In the method illustrated, the concentrated slop is dried in spray drier 22, and the spray-dried slop mixed with slop solids from centrifuge 20 and with dehydrated char, is dehydrated at about 325–350° C. in rotary dehydrator 23. From 10% to 50% of the dehydrated char from the rotary dehydrator is returned to be mixed with the dry or concentrated slop fed to the dehydrator. The remainder of the dehydrated char is activated in retort 24, for example, under the conditions described in my United States Patent No. 1,925,204.

The activated char is leached in vat 25 and filter 26, and a portion of the recovered potassium carbonate is utilized for neutralizing the dealcoholized slop in container 21.

The concentrated slop may be treated entirely separately from the solids separated therefrom or the further concentration of the slop may, if desired, be effected without removal of solids either before or after neutralization. The neutralization may be effected all at one time or it may be effected in separate stages, or gradually during the evaporation of the liquids. The advantages of decreased viscosity of the slop and the possibility of carrying the concentration in the evaporators to a higher density than in the case of unneutralized slop characterize all of such modifications and variations of the method of operation and the invention will, in general, be found useful in the treatment of normally acid industrial liquds containing organic substances.

I claim:

1. A method for the recovery of valuable products from normally acid fermentation liquors which comprises distilling the volatile organic compounds and a portion of the water from the liquor in a low pressure effect of a multiple effect evaporator, adding an alkaline material thereto in amount at least sufficient to neutralize the liquor, further concentrating the neutralized liquor in a higher pressure effect of said multiple effect evaporator heated by vapors from said low pressure effect, dehydrating the concentrated liquor to form a char, and activating the char.

2. In a method for the recovery of valuable products from normally acid fermentation liquors which comprises subjecting said liquors to multiple effect evaporation whereby volatile organic compounds are removed from the liquor in the first effects of said evaporation and the liquor is further concentrated in the succeeding effect thereof, the improvement which comprises adding to the liquor during said multiple effect evaporation after the volatile organic compounds have been substantially removed therefrom and prior to the completion of said multiple effect evaporation an alkaline material in amount at least sufficient to neutralize the liquor.

3. In a method for the recovery of valuable products from normally acid fermentation liquors which comprises subjecting said liquors to multiple effect evaporation whereby volatile organic compounds are removed from the liquor in the first effects of said evaporation and the liquor is further concentrated in the succeeding effects thereof, the improvement which comprises adding to the liquor during said multiple effect evaporation after the volatile organic compounds have been substantially removed therefrom and prior to the completion of said multiple effect evaporation an alkali metal carbonate in amount at least sufficient to neutralize the liquor.

4. In a method for the recovery of valuable products from normally acid fermentation liquors which comprises subjecting said liquors to multiple effect evaporation whereby volatile organic compounds are removed from the liquor in the first effects of said evaporation and the liquor is further concentrated in the succeeding effects thereof, the improvement which comprises adding to the liquor during said multiple effect evaporation after the volatile organic compounds have been substantially removed therefrom and prior to the completion of said multiple effect evaporation potassium carbonate in amount at least sufficient to neutralize the liquor.

5. In a method for the recovery of valuable products from normally acid fermentation liquors which comprises subjecting said liquors to multiple effect evaporation whereby volatile organic compounds are removed from the liquor in the first effects of said evaporation and the liquor is further concentrated in the succeeding effects thereof, the improvement which comprises neutralizing the liquor during said multiple effect evaporation after the volatile organic compounds have been substantially removed therefrom and prior to the completion of said multiple effect evaporation, drying the concentrated liquor, mixing the dried liquor with previously dehydrated liquor, dehydrating the mixture to form a char, and activating the char.

6. In a method for the recovery of valuable products from normally acid fermentation liquors which comprises subjecting said liquors to multiple effect evaporation whereby volatile organic compounds are removed from the liquor in the first effects of said evaporation and the liquor is further concentrated in the succeeding effects thereof, the improvement which comprises neutralizing the liquor during said multiple effect evaporation after the volatile organic compounds have been substantially removed therefrom and prior to the completion of said multiple effect evaporation, spray drying the concentrated liquor, mixing the dried liquor with previously dehydated liquor, dehydrating the mixture to form a char, and activating the char.

7. A method for the recovery of valuable products from normally acid fermentation liquors which comprises distilling the volatile organic compounds and a portion of the water from the liquor in a low pressure effect of a multiple effect evaporator, adding an alkaline material thereto in amount at least sufficient to neutralize the liquor, removing undissolved solids from the neutralized liquor, further concentrating the neutralized liquor in a higher pressure effect of said multiple effect evaporator heated by vapors from said low pressure effect, dehydrating the concentrated liquor to form a char, and activating the char.

8. A method for the recovery of valuable products from normally acid fermentation liquors which comprises distilling the volatile organic compounds and a portion of the water from the liquor in a low pressure effect of a multiple effect evaporator, adding an alkaline material thereto in amount at least sufficient to neutralize the liquor, removing undissolved solids from the neutralized liquor, further concentrating the neutralized liquor in a higher pressure effect of said multiple effect evaporator heated by vapors from said low pressure effect, mixing the concentrated liquor with previously dehydrated liquor, dehydrat the mixture to form a char, and activating the char.

GUSTAVE T. REICH.

CERTIFICATE OF CORRECTION.

Patent No. 2,148,579.  February 28, 1939.

GUSTAVE T. REICH.

It is hereby certified that error appears in the printed specification of the above numbered patent requiring correction as follows: Page 3, second column, line 8-9, claim 8, for "dehydrat" read dehydrating; and that the said Letters Patent should be read with this correction therein that the same may conform to the record of the case in the Patent Office.

Signed and sealed this 4th day of April, A. D. 1939.

Henry Van Arsdale (Seal)  Acting Commissioner of Patents.

neutralized liquor, further concentrating the neutralized liquor in a higher pressure effect of said multiple effect evaporator heated by vapors from said low pressure effect, dehydrating the concentrated liquor to form a char, and activating the char.

8. A method for the recovery of valuable products from normally acid fermentation liquors which comprises distilling the volatile organic compounds and a portion of the water from the liquor in a low pressure effect of a multiple effect evaporator, adding an alkaline material thereto in amount at least sufficient to neutralize the liquor, removing undissolved solids from the neutralized liquor, further concentrating the neutralized liquor in a higher pressure effect of said multiple effect evaporator heated by vapors from said low pressure effect, mixing the concentrated liquor with previously dehydrated liquor, dehydrat the mixture to form a char, and activating the char.

GUSTAVE T. REICH.

CERTIFICATE OF CORRECTION.

Patent No. 2,148,579.　　　　　　　　　　　　February 28, 1939.

GUSTAVE T. REICH.

It is hereby certified that error appears in the printed specification of the above numbered patent requiring correction as follows: Page 3, second column, line 8-9, claim 8, for "dehydrat" read dehydrating; and that the said Letters Patent should be read with this correction therein that the same may conform to the record of the case in the Patent Office.

Signed and sealed this 4th day of April, A. D. 1939.

Henry Van Arsdale (Seal)　　　　　　　　　　　　　　　　　Acting Commissioner of Patents.